United States Patent [19]

Förster et al.

[11] 4,369,029
[45] Jan. 18, 1983

[54] CERAMIC RECUPERATOR AND METHOD FOR THE HEATING OF COMBUSTION AIR

[75] Inventors: Siegfried Förster, Alsdorf; Berthold Sack, Aachen, both of Fed. Rep. of Germany

[73] Assignee: Kernforschungsanlage Julich GmbH, Julich, Fed. Rep. of Germany

[21] Appl. No.: 135,082

[22] Filed: Mar. 28, 1980

[30] Foreign Application Priority Data

Mar. 29, 1979 [DE] Fed. Rep. of Germany ....... 2912520

[51] Int. Cl.³ .................. F24H 7/00; F23D 11/44; F24H 3/00; F24H 1/00
[52] U.S. Cl. ...................................... 432/29; 165/166; 219/374; 219/378; 219/381; 431/208; 431/211; 431/215; 432/223
[58] Field of Search .................... 431/208, 1, 215, 211, 431/259; 432/223, 29; 219/374, 375, 378, 381, 382; 165/166

[56] References Cited

U.S. PATENT DOCUMENTS

| | | | |
|---|---|---|---|
| 2,458,835 | 1/1949 | Cornelius | 219/375 |
| 2,707,989 | 5/1955 | Schori | 431/259 X |
| 2,735,481 | 2/1956 | Reichelm | 431/211 X |
| 3,492,457 | 1/1970 | Subt | 219/374 |
| 3,927,300 | 12/1975 | Wada et al. | 219/381 |
| 4,104,018 | 8/1978 | McKay | 432/223 |

FOREIGN PATENT DOCUMENTS 563495 5/1931 Fed. Rep. of Germany ...... 431/208
2707290 9/1979 Fed. Rep. of Germany .

*Primary Examiner*—John J. Camby
*Attorney, Agent, or Firm*—Karl F. Ross

[57] ABSTRACT

A ceramic recuperator for the heating of combustion air, e.g. for an oil-fired burner or boiler, which prepares at least the air in the formation of a fuel-air mixture which is ignitable at the burner. According to the invention the recuperator is provided with means, especially electrically operated for heating the ceramic body so that the initial combustion air can be heated before firing of the burner and the further heating of the recuperator by combustion products.

8 Claims, 3 Drawing Figures

CERAMIC RECUPERATOR AND METHOD FOR THE HEATING OF COMBUSTION AIR

CROSS-REFERENCE TO RELATED APPLICATION

The present application is related to the commonly assigned copending application Ser. No. 100,634, filed Dec. 5, 1979, which is hereby incorporated in its entirety by reference.

FIELD OF THE INVENTION

Our present invention relates to a ceramic recuperator for the heating of combustion air which is to be fed to a burner for generating an ignitible fuel/air mixture.

BACKGROUND OF THE INVENTION

Ceramic recuperators for the heating of fluid adapted to form fuel/air mixtures are described, inter alia, in the aforementioned copending application and the literature there cited. Reference may also be had to German patent document (printed application-Auslegeschrift) DT-AS No. 27 07 290.

In general ceramic recuperators are known for the preheating of combustion air for oil burners and like combustion systems, utilizing combustion-gas heat which is indirectly transferred through the body of the ceramic recuperator to the combustion air to be preheated before being fed to the burner in the formation of the fuel/air mixture.

The preheating of the combustion air in this manner is of an energy-conserving nature, facilitates the efficient mixing of the fuel with the air and improves the burner output markedly.

During the operation of the oil burner, the preheating of the combustion air in the recuperator is effected by waste gases (combustion gases) drawn from the combustion chamber.

For the cold starting of the oil burner, hot combustion gases are not yet available and hence a preheating of the combustion air therewith is not possible. Until the combustion gases are generated at a sufficient temperature and in a sufficient quantity, the recuperative effect is limited.

In most cases the combustion air must be preheated even for cold starting of an oil heater to render the fuel sufficiently flowable or to induce vaporization of the fuel for proper combustion.

OBJECT OF THE INVENTION

It is the object of the present invention to provide an improved recuperator for the preheating of combustion air which can also be used at cold start, i.e. before the availability of the combustion gases which traverse the recuperator during normal operation.

SUMMARY OF THE INVENTION

This object and others which will become apparent hereinafter are attained, in accordance with the present invention, in a ceramic recuperator for the heating of combustion air and which is traversed through separate passages of the ceramic body by the combustion air and furnace waste gas or combustion gases for indirect heat exchange through the wall separating these passages.

According to the present invention the recuperator is provided with means for heating the ceramic body and controllable so as to be effective before combustion gases traverse the recuperator for bringing the combustion air to the requisite temperature.

According to the invention, the recuperator can be preheated, i.e. heated before entry of the combustion air thereto.

In other words, the recuperators provided with a heater for preheating the walls (i.e. the ceramic body) of the passages are traversed by the combustion air which thereupon picks up this thermal energy from the walls. Consequently, the combustion air traverses the passages after the preheating to the temperature required to vaporize the fuel.

After the operating temperature in the combustion chamber is reached and correspondingly higher waste temperature are found in the corresponding passages of the recuperator, the heating element for the walls of the passages is turned off.

According to a preferred embodiment of the invention, the heating unit is an electrical resistance heater which lies in contact with the ceramic body and, preferably, the walls of the passages to be traversed by the combustion air.

In a simple construction of this system, heating wires extend through the combustion-air passages. Naturally, the heating wires can also extend through the waste-gas passages inasmuch as they will there also serve to heat the ceramic body and, indirectly, the combustion air.

Excellent results have also been obtained when a resistance-heating unit is applied to the exterior of the ceramic recuperator.

The heating means can include heating plates, helically coiled heating wires, heating rods or any combination of the heating concepts previously described.

When the heating unit is applied to the exterior of the recuperator or in both the waste gas passages and the combustion air passages, the entire ceramic body forming the recuperator is heated, thereby making the heat capacity of the entire ceramic body serve as an exceptionally effective heat source for rapidly preheating the combustion air for cold start of the burner.

Furthermore, the walls of the passages of the ceramic body can be composed of the ceramic material which can include graphite or the like so as to make it conductive and thereby serve as a resistance heater without requiring additional heating elements.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
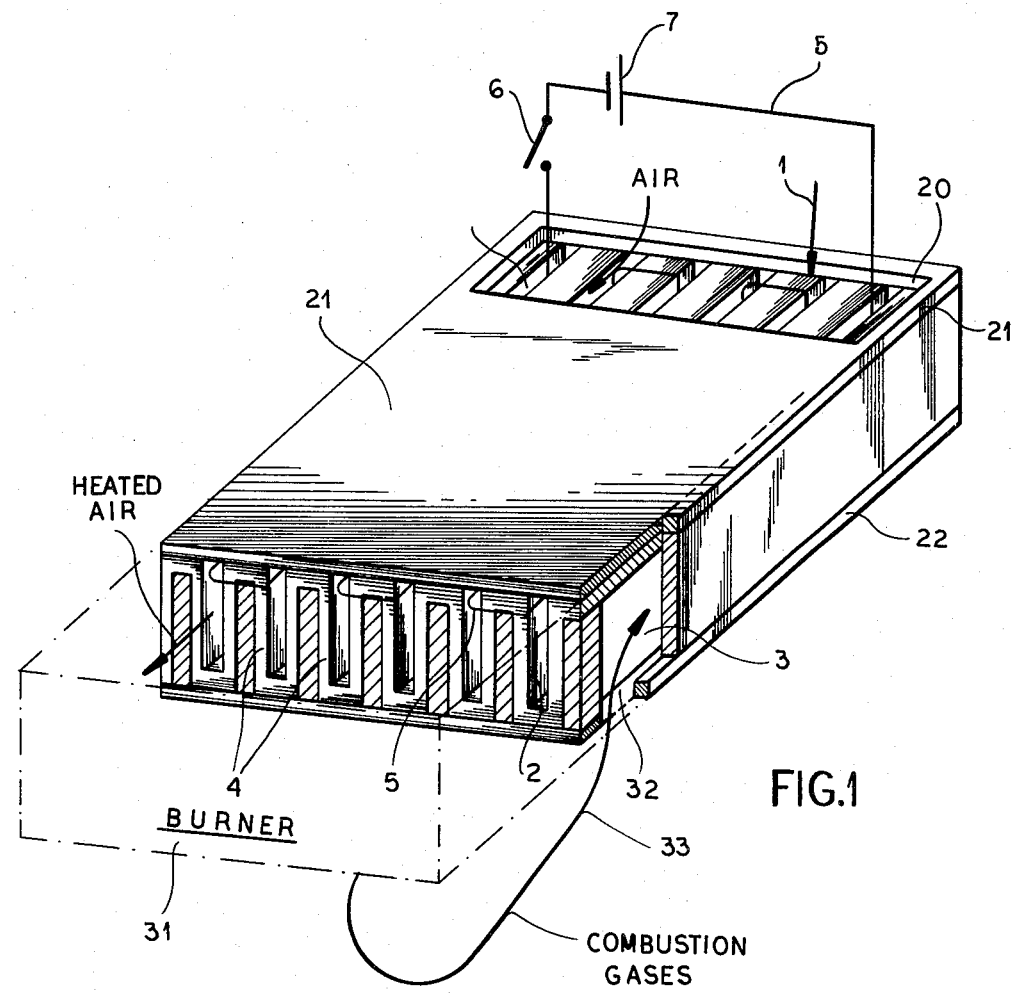
FIG. 1 is a diagrammatic perspective view, partly broken away, of a ceramic recuperator according to the present invention having electrical heating wires or cables extending through the passages.
Figure 2:
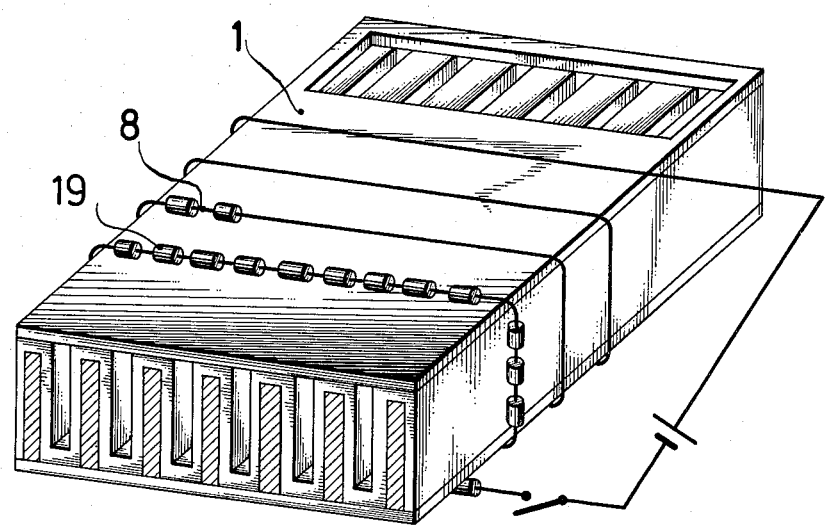
FIG. 2 is a view similar to FIG. 1 of a system in which the electrical heating elements are applied to the exterior of the ceramic body.
Figure 3:
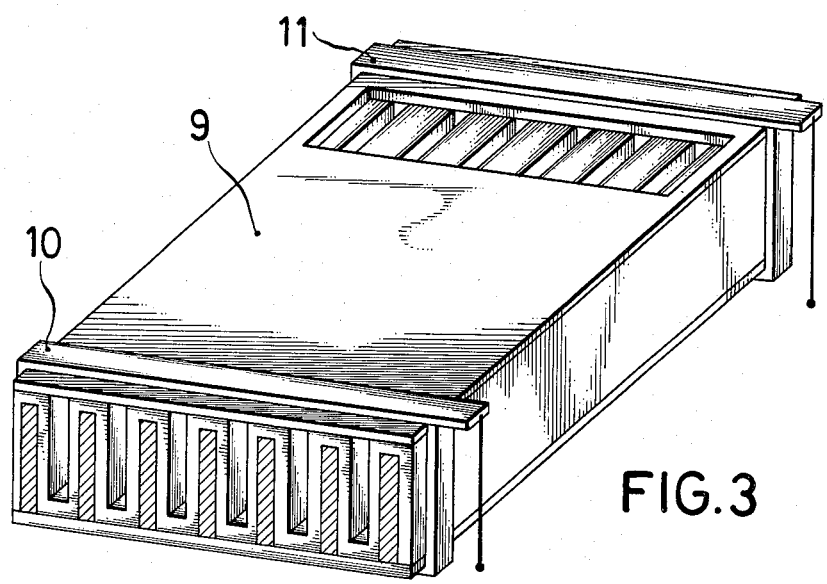
FIG. 3 is a view similar to FIG. 1 utilizing an intrinsically conductive ceramic material for the electrical heating of the body.

In FIGS. 1 through 3 we have shown a recuperator for the heating of combustion air which can be of the type described in the aforementioned copending application and can be utilized in similar burner systems. In general the recuperator will be constructed of a ceramic material and will include passages for the combustion air and the exhaust or waste gas.

In some cases, as described in the aformentioned copending application, it may also include passages for the fuel.

In all cases, these passages will precede the mixing zone at which the combustion air mixes with the fuel to form an ignitable and combustible mixture.

Furthermore, any of the electrical heating systems represented in FIGS. 1 through 3 can be used in combination with any other and anyone of the systems or any combination of two or more of them can be used for any of the recuperative heating units described in the aforementioned copending application.

In general the ceramic recuperator can consist of a one-piece ceramic body 1 of rectangular cross section which is formed with parallel passages 2,3 also of rectangular cross section and highly elongated.

The passages 2, which serve to conduct the combustion air, can be preheated, open at one side of the body 1, while the passages 3 which are interspaced with the passages 2, open at the opposite side of the body 1. The body 1 is flanked by cover plates which may be provided with openings 32 communicating with the combustion chamber so that the combustion gases 33 can be drawn through the passages 3 and discharged into a chimney or stack and/or with passages 20 permitting the combustion air to be introduced into passages 2 and discharged into the burner zone of the combustion chamber, all as described in the copending application.

The left-hand end of the body 1 shown in FIGS. 1 through 3 has the passages 3 closed off so that this end serves to discharge the heated combustion air fed through the upper plate and a window 20 at the opposite end of the ceramic body 1.

In FIG. 1, the upper plate is represented as 21 while the lower plate is represented as 22.

Since the passages 2 and 3 are interspaced with one another they have common walls 4 which serve for effecting indirect heat exchange between the heated combustion gases and the combustion air in counterflow (see German patent document No. 27 07 290 also mentioned previously).

In the embodiment of FIG. 1, the passages 2 are provided with electric heating wires 5 which are connected to an electric current source 7 in series with a switch 6 which can be closed before cold starting of the burner to preheat the ceramic body. The amount of heating and the duration is determined by the heat capacity of the wires 5 and should be sufficient to raise the temperature of the recuperator to a temperature well above that required for the combustion air to vaporize a liquid fuel at cold start.

The cables 5 can also extend through the passages 3 and many more turns of such cables can be provided as desired.

Special insulation of the heating wires within the ceramic recuperator is generally not required since the recuperator body normally consists of a ceramic which is electrically insulating.

The heating cable can be a single strand or a multi-strand cable and, in place of the heating cable, heating rods can be provided in the passages connected at their ends by appropriate flexible wires.

In FIG. 2 we have shown another embodiment of the invention in which the heating element is coiled around the exterior of the ceramic body forming the recuperator. The heating cable or wire may be spaced from the body 1 or protected by insulators 19. In place of the heating coils, resistance rods can be placed in direct contact with the recuperator body as well.

Yet another system embodying the present invention is shown in FIG. 3 wherein the recuperator 9, which has the same basic configuration and parts as that of FIGS. 1 and 2, is composed of a conductive ceramic, i.e. a ceramic containing metal particles and graphite particles so as to render it electrically conductive.

The two ends of the recuperator are engaged by electrodes 10 and 11 and the electrodes are connected in series with a switch across an electric power source so as to induce ohmic resistance losses in the conductive path between these electrodes for a particularly uniform heating of the recuperator.

When a ceramic which contains graphite or metal particles is not satisfactory, the ceramic material constituting the recuperator can be silicon carbide.

By way of example, an electrically heated ceramic recuperator according to the present invention having a mass of about 1 kg and used for an oil burner with a heating capacity of about 20,000 kilocalories per hour, requires resistance heating with the power of 2,000 watts in about one minute to be heated to the desired temperature of 200° C. This temperature suffices to preheat the air so that when it mixes with the requisite quantity of fuel oil, the fuel oil will be vaporized in the combustion air/fuel mixture.

Mention may be made of the fact that the principles of the invention may be applicable to metallic recuperators as well, provided that the resistance heating elements are insulated from the metal walls of the recuperator.

We claim:

1. A ceramic recuperator comprising:
    a ceramic body formed with passages for a hot combustion gas and combustion-sustaining air separated by ceramic walls through which indirect heat exchange between said air and said gas is effected, the air passages communicating with a burner for liquid fuel vaporized at least in part by heat of said air to permit combustion of the vaporized fuel in said air and production of said hot combustion gas; and
    heating means on said body for preheating same prior to the inception of combustion for initial preheating of said air and prior to the passage of air through said body.

2. The recuperator defined in claim 1 wherein said heating means includes
    an electrical resistance heating element on said body;
    a source of electrical energy connected to said element; and
    a switch connected in series with said source and said element for automatically disconnecting said element from said source upon the heating of said body to an elevated temperature.

3. The recuperator defined in claim 2 wherein said resistance heating element is formed in part by a conductive portion of said body.

4. The recuperator defined in claim 3 wherein said body is composed of an electrically conductive ceramic material, said element including electrodes in contact with said body at spaced apart locations thereof.

5. The recuperator defined in claim 2 wherein said element is an electrical resistance heater wrapped around said body.

6. The recuperator defined in claim 2 wherein said element includes a resistive heating element running through at least some of the air passages of said body in direct contact with the air therein.

7. The recuperator defined in claim 2 wherein said body is a rectangular ceramic block formed with narrow elongated passages traversed by said air and opening at one side of said block and narrow elongated passages traversed by said gas opening on the opposite side of said block, said block being closed at least in part along said side by respective ceramic plates.

8. In a method of combustion wherein a liquid fuel is burnt with air to form combustion gases in a combustion chamber, the improvement which comprises the steps of:

(a) passing said air prior to mixing it with said fuel through a multiplicity of elongated passages in a ceramic body;

(b) electrically heating said ceramic body at least for a period prior to the generation of combustion gas in said chamber to preheat said air to a temperature whereby said air induces evaporation of at least a portion of said fuel upon the mixing of the preheated air with fuel; and (c) passing hot combustion gases from said chamber through other passages in said body in indirect heat exchange with said air and cutting off the electrical heating of said body upon said combustion gas having a temperature sufficient to preheat said air to enable same to at least partially evaporate said fuel.

* * * * *